(12) United States Patent
Caliboso

(10) Patent No.: US 7,556,423 B2
(45) Date of Patent: Jul. 7, 2009

(54) TEMPERATURE SENSOR BOW COMPENSATION

(75) Inventor: Amado Abella Caliboso, Sunnyvale, CA (US)

(73) Assignee: Microchip Technology Incorporated, Chandler, AZ (US)

(*) Notice: Subject to any disclaimer, the term of this patent is extended or adjusted under 35 U.S.C. 154(b) by 118 days.

(21) Appl. No.: 11/860,633

(22) Filed: Sep. 25, 2007

(65) Prior Publication Data

US 2008/0165823 A1    Jul. 10, 2008

Related U.S. Application Data

(60) Provisional application No. 60/883,853, filed on Jan. 8, 2007.

(51) Int. Cl.
*G01K 15/00* (2006.01)
*G01K 7/00* (2006.01)
*G01D 18/00* (2006.01)

(52) U.S. Cl. .................. 374/1; 374/171; 327/513; 702/99; 702/86

(58) Field of Classification Search .......... 374/1, 374/170, 171; 702/86, 99, 104; 327/512, 327/513
See application file for complete search history.

(56) References Cited

U.S. PATENT DOCUMENTS

| | | | | | |
|---|---|---|---|---|---|
| 4,060,715 | A | * | 11/1977 | Scott | 702/133 |
| 5,053,640 | A | * | 10/1991 | Yum | 327/539 |
| 5,933,045 | A | * | 8/1999 | Audy et al. | 327/513 |
| 6,198,296 | B1 | * | 3/2001 | Ivanov | 324/725 |
| 6,329,868 | B1 | * | 12/2001 | Furman | 327/513 |
| 6,908,224 | B2 | * | 6/2005 | Schneider et al. | 374/1 |
| 7,331,708 | B2 | * | 2/2008 | Blom et al. | 374/171 |

* cited by examiner

*Primary Examiner*—Lisa M Caputo
*Assistant Examiner*—Mirellys Jagan
(74) *Attorney, Agent, or Firm*—King & Spalding LLP

(57) ABSTRACT

The output of a solid-state temperature sensor is the ratio of a voltage proportional to a reference voltage. The solid-state temperature sensor used diodes in its sensing and reference circuits, however, these diodes exhibit a second order behavior that causes the temperature sensor output response to deviate from an ideal straight line. This output response deviation has a characteristic error curve that is shaped like a parabola. An offset that varies opposite to that of the temperature sensor output response deviation may be determined and applied in the digital domain as offset compensation after the temperature has been conversed to a digital value with an analog-to-digital converter (ADC). By adding this offset compensation to the digital output of the ADC, digital representations of the measured temperatures will track more linearly.

9 Claims, 6 Drawing Sheets

TEMPERATURE SENSOR BOW COMPENSATION

RELATED PATENT APPLICATION

This application claims priority to commonly owned U.S. Provisional Patent Application Ser. No. 60/883,853; filed Jan. 8, 2007; entitled "Temperature Sensor Bow Compensation," by Amado Abella Caliboso; which is hereby incorporated by reference herein for all purposes.

TECHNICAL FIELD

The present disclosure relates to solid-state temperature sensors, and more particularly, to a way of compensating the error in solid-state temperature sensors caused by the nonlinear characteristic of the solid-state temperature sensor diodes.

BACKGROUND

Monolithic Digital temperature sensors utilize diodes as the sensing and reference elements in solid-state temperature sensors. The diodes used in these solid-state temperature sensors as part of the sensing and reference circuit have a voltage that is inversely proportional to temperature. However, a second order term that causes this relationship to deviate from the ideal straight line curve introduces an error to the sensor output. This is a significant source of error for the temperature output and limits the accuracy of the sensor.

Most approaches used in solving the problem introduced by the diode voltage curvature have been to implement the compensation in the analog section of the temperature sensor. Another approach used for linearization is to have a lookup table so that different corrections can be made at different points in the transfer curve. But this results in a correction that is not smooth when only a few corrections points are implemented. If more lookup points are added, the amount of circuitry, e.g., lookup table size, needed becomes large.

SUMMARY

What is needed is a way to compensate for the nonlinear characteristic of diodes over a temperature range (diode voltage curvature) in order to reduce the measurement error of a solid-state temperature sensor.

According to a specific example embodiment of this disclosure, a method for correcting temperature measurement error of a solid-state temperature sensor comprises the steps of: (a) providing a solid-state temperature sensor capable of producing a plurality of temperature output values, wherein each one of the plurality of temperature output values represents a respective temperature that the solid-state temperature sensor can measure; (b) determining a vertex value from an error curve of the plurality of temperature output values; (c) subtracting the vertex value from a presently measured one of the plurality of temperature output values; (d) squaring the result of step (c); (e) dividing the result of step (d) by a scaler value, wherein the scaler value is chosen to produce a corrected value thereof; and (f) adding the result of step (e) to the presently measured one of the plurality of temperature output values to produce a corrected temperature output value thereof.

According to another specific example embodiment of this disclosure, a system for correcting temperature measurement error of a solid-state temperature sensor comprises: a solid-state temperature sensor capable of producing a plurality of temperature output values, wherein each one of the plurality of temperature output values represents a respective temperature that the solid-state temperature sensor can measure; a subtraction function for subtracting a vertex value from a presently measured one of the plurality of temperature output values; a squaring function for squaring an output from the subtraction function; a dividing function for dividing an output from the squaring function by a scaler value; and an adding function for adding the presently measured one of the plurality of temperature output values to the dividing function output, wherein the adding function output comprises a corrected temperature output value of the presently measured one of the plurality of temperature output values.

BRIEF DESCRIPTION OF THE DRAWINGS

A more complete understanding of the present disclosure thereof may be acquired by referring to the following description taken in conjunction with the accompanying drawings wherein.

Figure 1:
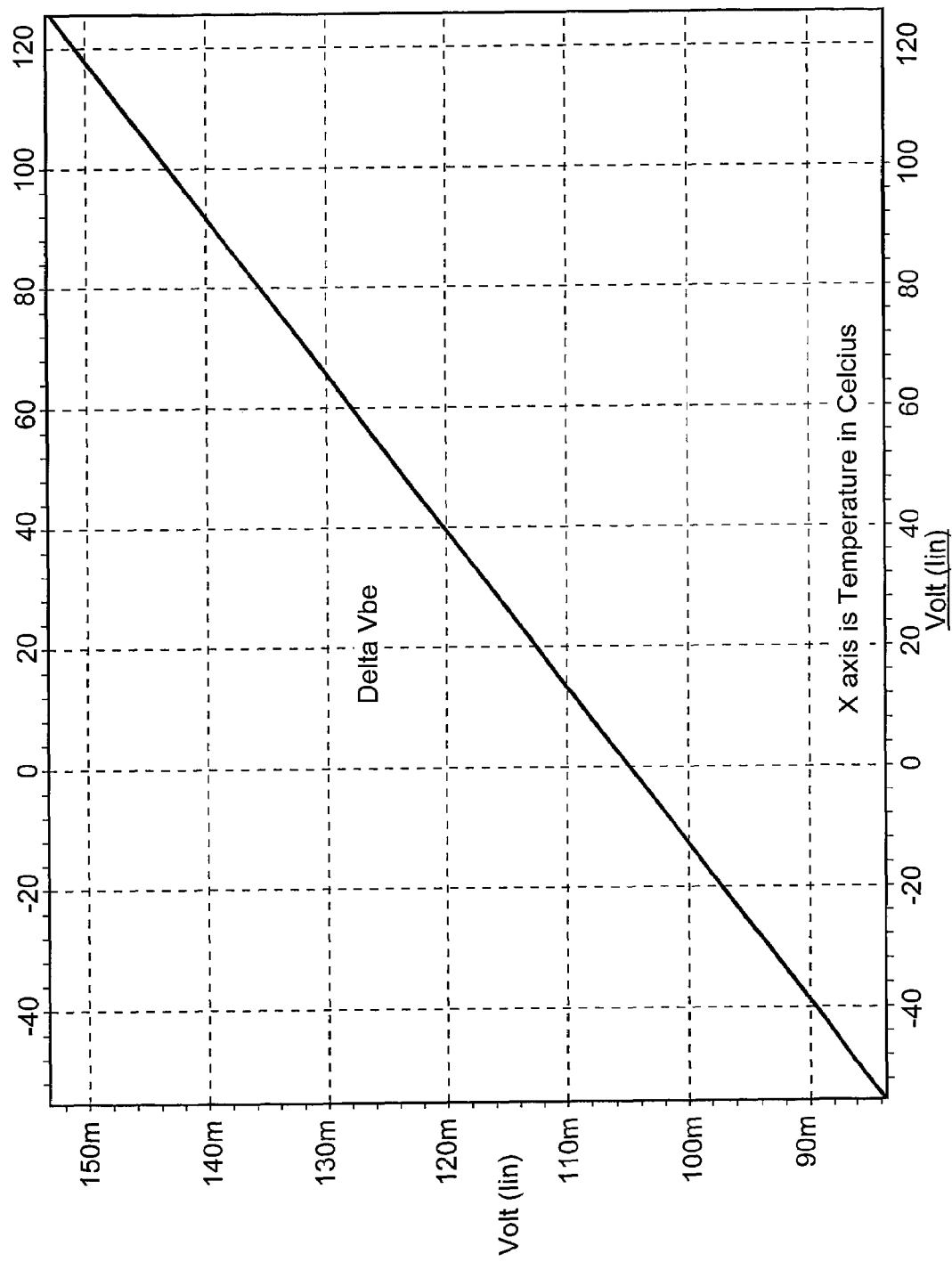
FIG. 1 is a graph showing the voltage difference, $\Delta Vbe$, between two semiconductor diodes operating at different current densities as a function of temperature.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a graph showing the voltage difference, $\Delta Vbe$, between two semiconductor diodes operating at different current densities as a function of tem perature. Generally a temperature sensor has a transfer function of the form:

$$\text{Temperature} = m*V\text{sens}/V\text{ref} + n*V\text{ref} \quad (1)$$

Where Vsens is a variable directly proportional to temperature and Vref is a temperature invariant constant. The coefficients m and n are chosen to have the desired sensitivity (gain) and offset for a particular application. In a solid-state digital temperature sensor, the terms in Equation (1) hereinabove may be implemented as:

$$\text{Tempout} = m*\Delta Vbe/V\text{bandgap} + n*V\text{bandgap} \quad (2)$$

where ΔVbe is the voltage difference between two diodes operated at different current densities. This variable changes linearly with temperature as illustrated in the graph of FIG. 1.

Figure 2:
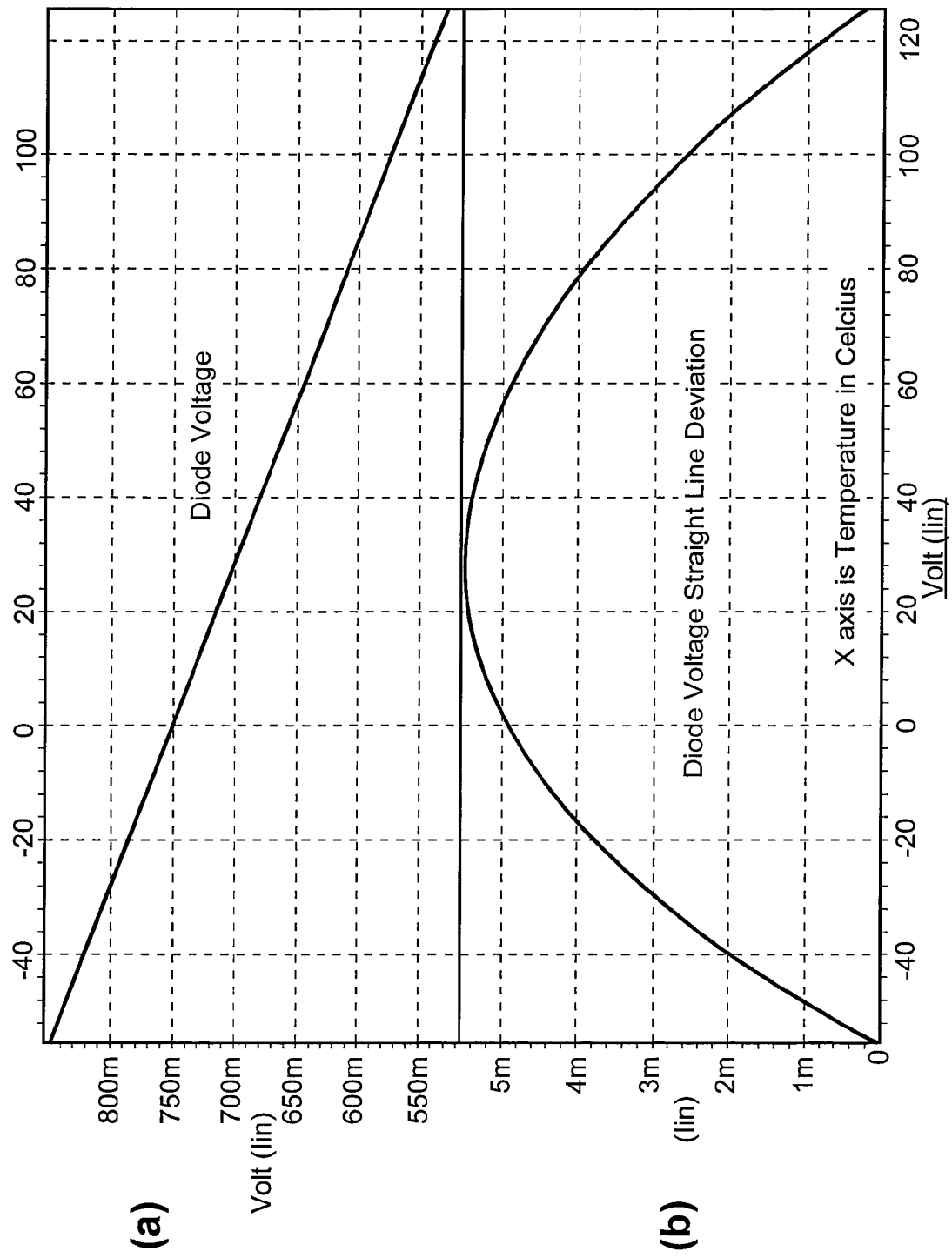
FIG. 2(a) is a graph showing the diode voltage, Vbe, as it varies inversely with temperature.
FIG. 2(b) is a graph of the curvature of the diode voltage, Vbe, as a function of temperature showing the deviation of Vbe from an ideal straight line.

The reference Vbandgap may be implemented as:

$$V\text{bandgap} = Vbe + k*\Delta Vbe \quad (3)$$

where Vbe is the diode voltage that varies inversely with temperature as illustrated in FIG. 2(a), and k is a scaling constant.

Figure 3:
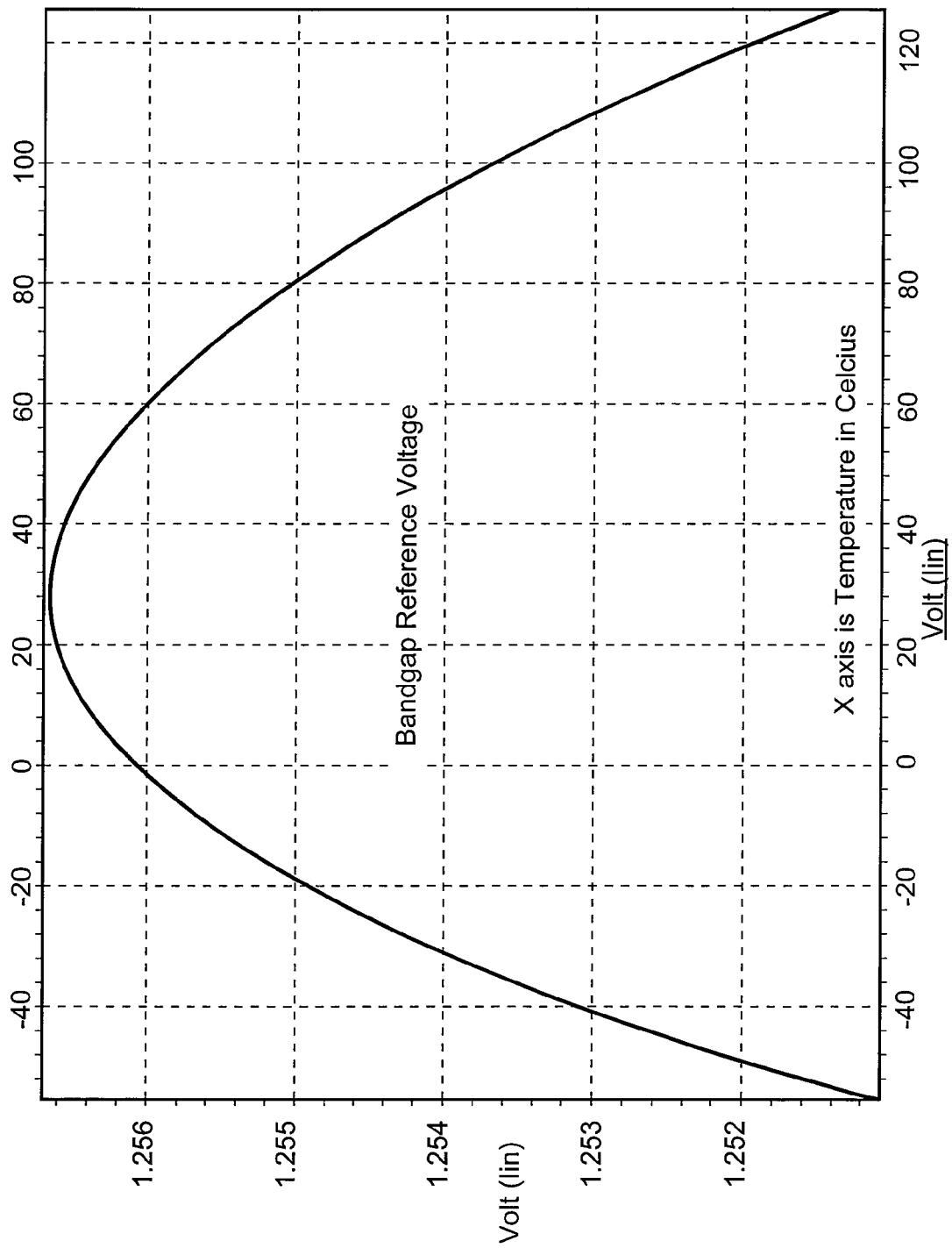
FIG. 3 is a graph showing a bandgap reference voltage as a function of temperature.

Since the temperature coefficients are opposite for the two terms, Vbe and ΔVbe, in Equation (3) hereinabove, with the proper choice of the coefficient k, the first order behavior of Vbandgap can be made to be substantially temperature invariant. However, although ΔVbe is linear, Vbe has a curvature as a function of temperature. FIG. 2(b) illustrates a graph of the curvature of the diode voltage, Vbe, as a function of temperature showing the deviation of Vbe from an ideal straight line. This results in a bandgap voltage that has a similar curvature and may be referred to as a bow. FIG. 3 illustrates a graph of a bandgap reference voltage as a function of temperature.

Figure 4:
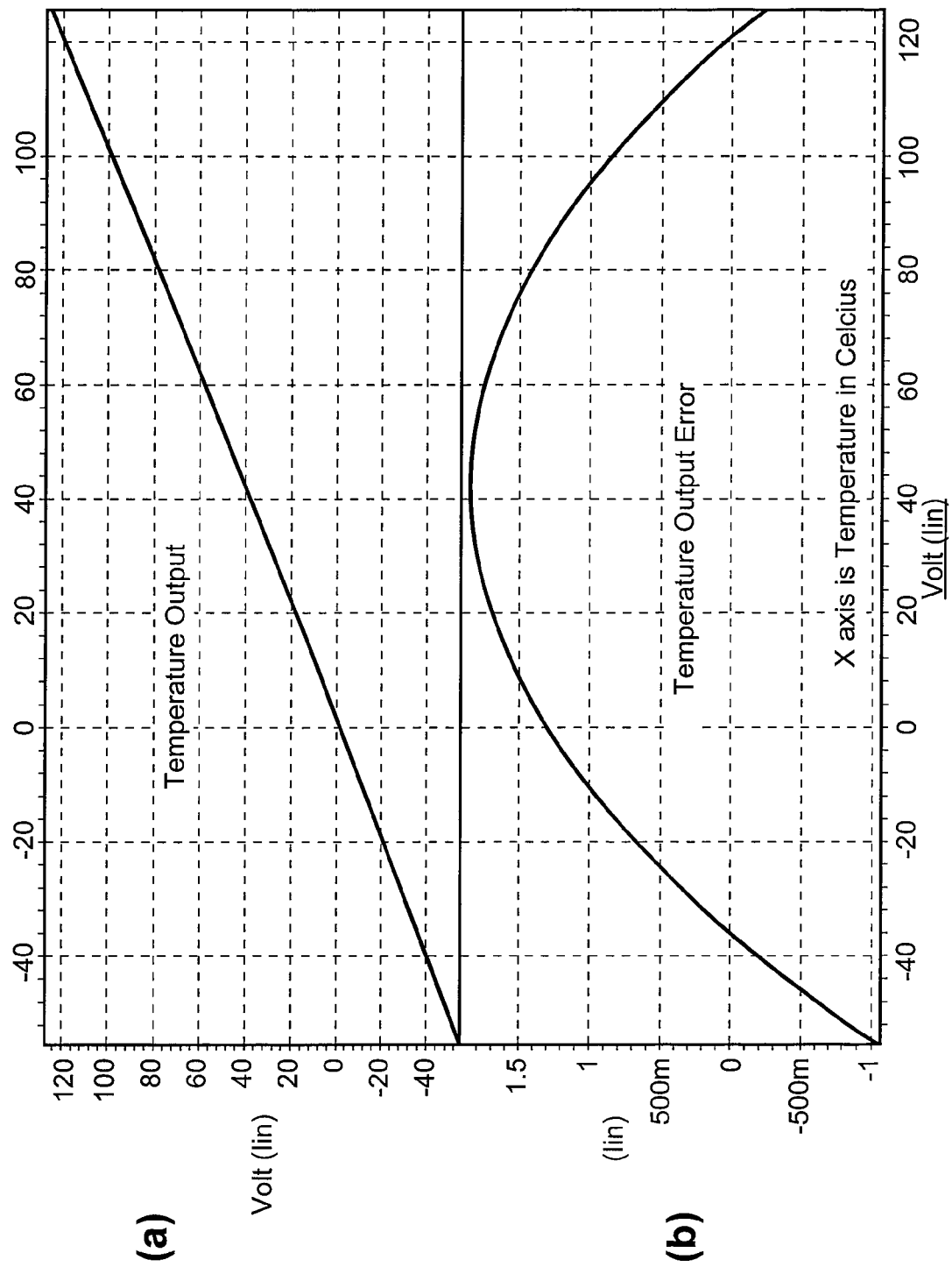
FIG. 4(a) is a graph showing the temperature output of a temperature sensor.
FIG. 4(b) is a graph showing the temperature output deviation from an ideal straight line.

When an implementation of Equation (2) is plotted over temperature, the results are substantially similar to what is illustrated in FIGS. 4(a) and 4(b). FIG. 4(a) illustrates a graph of the temperature output of a temperature sensor, and FIG. 4(b) illustrates a graph of the temperature output deviation from an ideal straight line.

This behavior is quite consistent and may be used for compensating the temperature output deviation from an ideal straight line. Substantial correction of this error may be determined by:

$$\text{Correction} = (\text{Tempout} - \text{Vertex})^2/\text{Scaler} \quad (4)$$

where Vertex is the temperature that occurs at the vertex (peak) of the error curve. The magnitude of this correction increases as Tempout deviates away from Vertex. Scaler may be chosen to have the right magnitude at the endpoints of the curve. This correction can then be added to Tempout (output from the temperature sensor analog-to-digital converter) to obtain a more linear output.

Thus, CorrectedTempout may be determined by:

$$\text{CorrectedTempout} = m*\Delta Vbe/V\text{bandgap} + n*V\text{bandgap} + \text{Correction} \quad (5)$$

The arithmetic operations involved in Equations (4) and (5) may be implemented in the digital domain and may be performed without changing and/or adding any elements in the analog circuits of the solid-state temperature sensor, according to the teachings of this disclosure.

Figure 5:
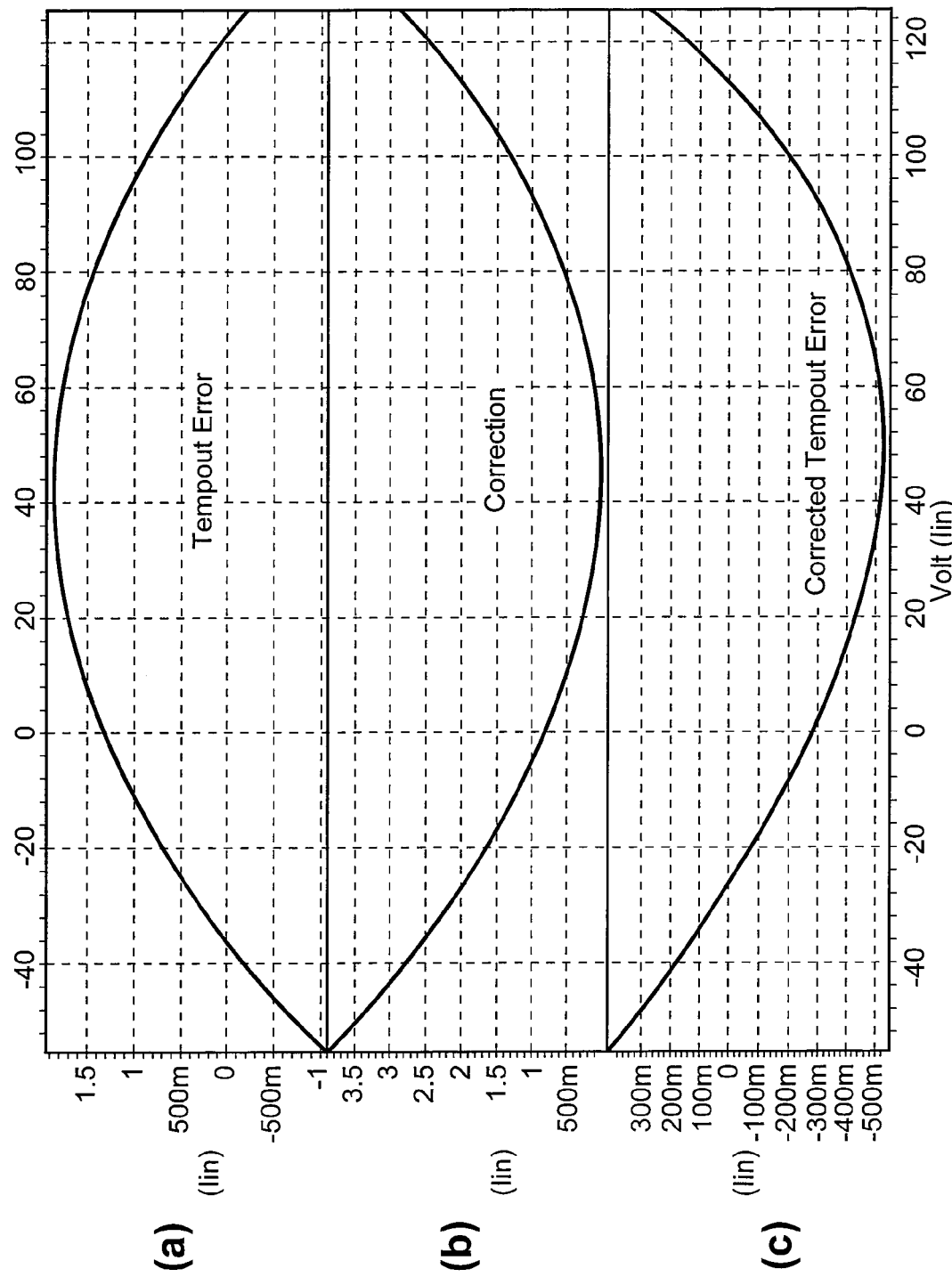
FIG. 5(a) is a graph showing temperature output error.
FIG. 5(b) is a graph showing calculated correction of the temperature output.
FIG. 5(c) is a graph showing temperature error after correction is added back to the temperature output.

FIG. 5(a) is a graph showing the error of the temperature output, FIG. 5(b) is a graph showing calculated correction of the temperature output, and FIG. 5(c) is a graph showing the temperature error after correction of FIG. 5(b) is added to the temperature output of FIG. 5(a). An offset correction may also be performed to center the final error distribution, according to the teachings of this disclosure.

Figure 6:
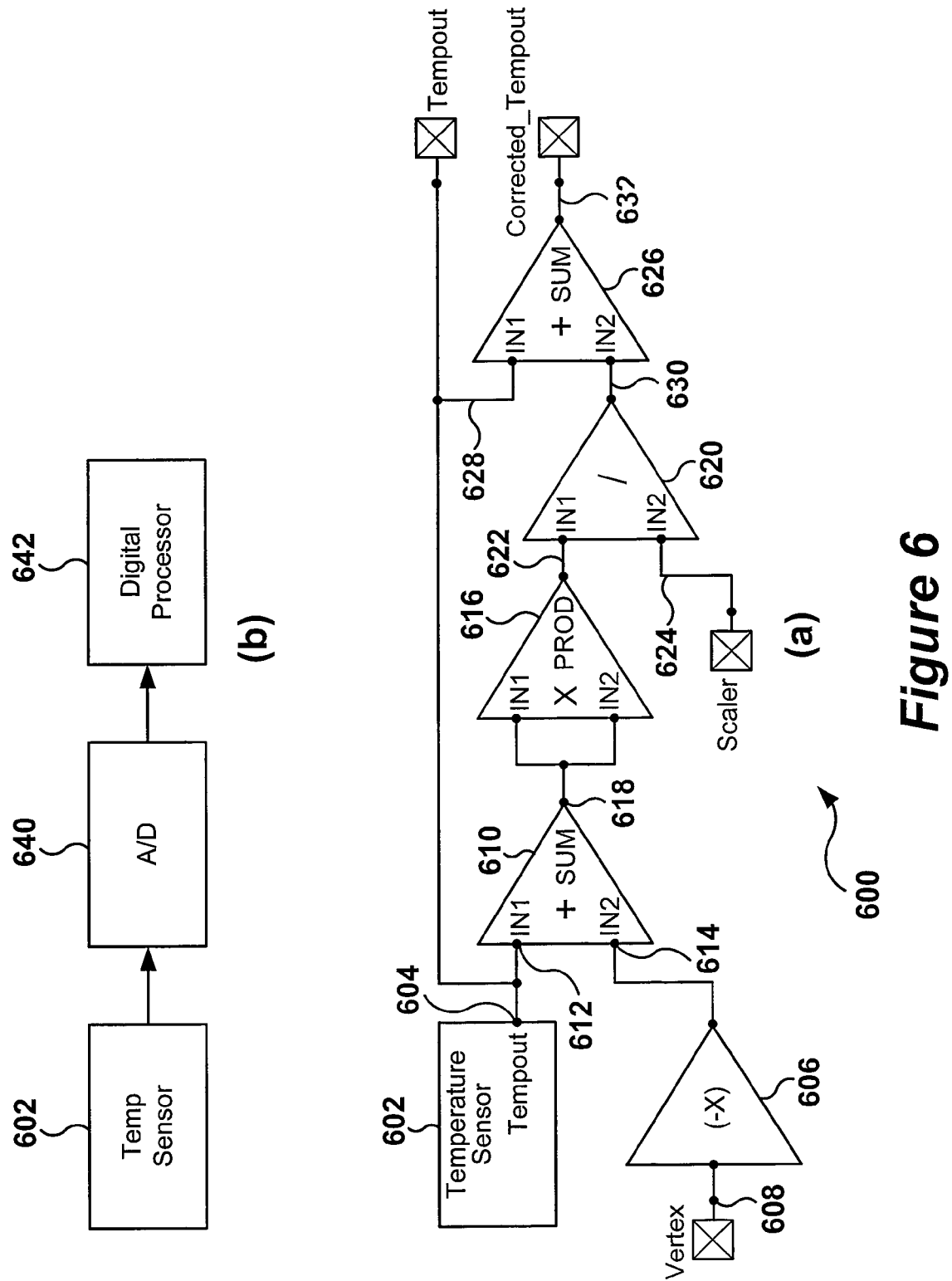
FIG. 6(a) is a schematic functional block diagram for correcting the temperature output error, according to a specific example embodiment of this disclosure.
FIG. 6(b) is a schematic block diagram of a system for performing the operations of correcting the temperature output error as illustrated in FIG. 6(a).

Referring to FIG. 6(a), depicted is a schematic functional block diagram for correcting the temperature output error, according to a specific example embodiment of this disclosure. The temperature output error correction function, generally represented by the numeral 600, comprises: An input for receiving an output 604 representing a temperature measurement from a temperature sensor 602. A sign inverter function 606 having an input 608 coupled to a temperature Vertex value described more fully hereinabove. An adder function 610 having a first input 612 coupled to the output 604 of the temperature sensor 602 and a second input coupled to the output of the sign inverter function 606. A squaring function 616 coupled to the output 618 of the adder function 610 and producing at its output the square of its input. A divider function 620 having a numerator input 622 coupled to the output of the squaring function 616 and a divisor input 624 coupled to a Scaler value, as more fully defined hereinabove. And an adder function 626 having a first input 628 coupled to the digital output 604 of the temperature sensor 602 and a second input 630 coupled to the output of the divider function 620. The output 632 of the adder function 626 produces the CorrectedTempout as defined more fully in Equation (5) hereinabove.

Referring to FIG. 6(b), depicted is a schematic block diagram of a system for performing the operations of correcting the temperature output error as illustrated in FIG. 6(a). The output from the temperature sensor 602 is coupled to an analog-to-digital converter (ADC) 640 which converts the temperature sensor 602 temperature measurements into digital values thereof. The digital temperature measurement values from the output of the ADC 640 is coupled to a digital input(s) of a digital processor 642. The digital temperature measurement values may be serial or parallel digital information. The digital processor 642 may be a microprocessor, a microcontroller, an application specific integrated circuit (ASIC), a programmable logic array (PLA), a field-programmable gate array (FPGA), a digital signal processor (DSP), etc. The digital processor 642 may perform the aforementioned functions illustrated in FIG. 6(a) by operating under the control of a software program (not shown). The ADC 640 and the digital processor 642 may be one integrated circuit device, or the ADC 640 may be part of the temperature sensor 602.

It is contemplated and within the scope of this disclosure that the aforementioned functions may be performed in the digital domain as software steps of a temperature correction program running in a digital processor, e.g., microcontroller; and/or with digital logic (fully or partially), and/or in the analog domain with analog functions, or any combination thereof.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for correcting temperature measurement error of a solid-state temperature sensor, said method comprising the steps of:
   (a) providing a solid-state temperature sensor capable of producing a plurality of temperature output values, wherein each one of the plurality of temperature output values represents a respective temperature that the solid-state temperature sensor can measure;
   (b) determining a vertex value from an error curve of the plurality of temperature output values;
   (c) subtracting the vertex value from a presently measured one of the plurality of temperature output values;
   (d) squaring the result of step (c);
   (e) dividing the result of step (d) by a scaler value, wherein the scaler value is chosen to produce a corrected value of the result of step (d); and
   (f) adding the result of step (e) to the presently measured one of the plurality of temperature output values to produce a corrected temperature output value.

2. The method according to claim 1, wherein the plurality of temperature output values are digital representations of temperatures that the solid-state temperature sensor can measure.

3. The method according to claim 2, wherein steps (b)-(f) are performed with a software program running in a digital processor.

4. A system for correcting temperature measurement error of a solid-state temperature sensor, said system comprising:
   a solid-state temperature sensor capable of producing a plurality of temperature output values, wherein each one of the plurality of temperature output values represents a respective temperature that the solid-state temperature sensor can measure;
   a subtraction means for subtracting a vertex value from a presently measured one of the plurality of temperature output values;
   a squaring means for squaring an output from the subtraction means;
   a dividing means for dividing an output from the squaring means by a scaler value; and
   an adding means for adding the presently measured one of the plurality of temperature output values to the dividing means output, wherein the adding means output comprises a corrected temperature output value of the presently measured one of the plurality of temperature output values.

5. The system according to claim 4, further comprising an analog-to-digital converter (ADC) coupled to the solid-state temperature sensor and producing a digital representation of the presently measured one of the plurality of temperature output values.

6. The system according to claim 5, wherein the subtraction, squaring, dividing and adding means are performed with a digital processor coupled to the ADC.

7. The system according to claim 6, wherein the digital processor performs the subtraction, squaring, dividing and adding functions under control of a software program.

8. The system according to claim 6, wherein the digital processor performs the subtraction, squaring, dividing and adding functions with hardware logic.

9. The system according to claim 6, wherein the digital processor is selected from the group consisting of a microprocessor, a microcontroller, an application specific integrated circuit (ASIC), a programmable logic array (PLA), a field-programmable gate array (FPGA), and a digital signal processor (DSP).

* * * * *